(12) United States Patent
Butscher

(10) Patent No.: US 10,732,193 B2
(45) Date of Patent: Aug. 4, 2020

(54) OPEN ARCHITECTURE GIMBALED NAVIGATION SYSTEM USING LATTICE SHELLS

(71) Applicant: The Boeing Comapny, Chicago, IL (US)

(72) Inventor: Stephen Butscher, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 15/899,144

(22) Filed: Feb. 19, 2018

(65) Prior Publication Data

US 2019/0257852 A1    Aug. 22, 2019

(51) Int. Cl.
*G01P 3/00* (2006.01)
*A63B 37/00* (2006.01)
(Continued)

(52) U.S. Cl.
CPC ............ *G01P 3/00* (2013.01); *A63B 37/0098* (2013.01); *F16M 11/12* (2013.01); *G01C 21/18* (2013.01)

(58) Field of Classification Search
CPC ........ G01C 25/00; G01C 25/005; G01C 9/06; G01C 19/42; G01C 21/16; B25J 9/1692; B62D 15/02; A63B 2220/40; A63B 24/0021; A63B 2225/50; G01P 1/006; G01P 15/132; G01P 15/097; G01P 3/18; G01P 3/495; G01P 1/08; G01P 1/11; G01P 15/04; G01P 15/036; G01P 15/06; B60Q 1/54; G01H 1/00; G01H 11/02; G01V 1/181; G01D 11/30; G01D 11/245; G21C 17/017; B60N 2/505; B60N 2/502;
(Continued)

(56) References Cited

U.S. PATENT DOCUMENTS

| 5,077,894 A * | 1/1992 | Martin | B21D 53/04 |
| | | | 122/18.1 |
| 5,097,899 A * | 3/1992 | Martin | B21D 53/04 |
| | | | 165/169 |
| 7,561,784 B2 * | 7/2009 | Wescott | G01C 21/18 |
| | | | 248/184.1 |
| 7,905,463 B2 * | 3/2011 | Burnham | F16M 11/123 |
| | | | 248/177.1 |

(Continued)

OTHER PUBLICATIONS

Extended European Search Report prepared by the European Patent Office in application No. EP 19 15 7989.5 dated Jul. 10, 2019.

*Primary Examiner* — John Fitzgerald
*Assistant Examiner* — Truong D Phan
(74) *Attorney, Agent, or Firm* — McDonnell Boehnen Hulbert & Berghoff LLP

(57) ABSTRACT

An inertial measurement unit includes a first spherical gimbal comprising a first lattice structure including a first plurality of trusses defining a first plurality of interstitial voids between the first plurality of trusses. The inertial measurement unit further includes a second spherical gimbal comprising a second lattice structure including a second plurality of trusses defining a second plurality of interstitial voids between the second plurality of trusses. The first spherical gimbal is positioned inside of the second spherical gimbal and pivotally coupled to the second spherical gimbal to form a gap between the first spherical gimbal and the second spherical gimbal. The inertial measurement unit further includes an instrument mount positioned within and pivotally coupled to the first spherical gimbal.

20 Claims, 8 Drawing Sheets

(51) Int. Cl.
*F16M 11/12* (2006.01)
*G01C 21/18* (2006.01)

(58) Field of Classification Search
CPC ........ B60N 2/525; F16M 11/12; F16M 11/18;
E21B 7/025; F41G 7/36; F42B 15/01;
F28D 1/06; F25B 39/02; A01J 9/04;
G03B 15/00; G03B 15/006; B64D 47/08
USPC ....... 73/1.75, 488, 1.78, 497–499, 492, 652,
73/866.5; 244/3.2; 248/550, 660;
165/169; 396/13
See application file for complete search history.

(56) References Cited

U.S. PATENT DOCUMENTS

| | | | |
|---|---|---|---|
| 8,558,150 B2 * | 10/2013 | Chappell | F41G 7/36 |
| | | | 244/3.1 |
| 9,874,579 B1 * | 1/2018 | Butscher | G01P 1/006 |
| 9,986,660 B2 * | 5/2018 | Butscher | G01P 15/00 |
| 10,495,492 B2 * | 12/2019 | Sar | G01D 21/02 |
| 2008/0041173 A1 * | 2/2008 | Tormoen | F16L 55/38 |
| | | | 73/866.5 |
| 2010/0019120 A1 * | 1/2010 | Burnham | F16M 11/123 |
| | | | 248/550 |
| 2011/0127365 A1 * | 6/2011 | Chappell | F41G 7/36 |
| | | | 244/3.2 |
| 2011/0205703 A1 * | 8/2011 | Weaver | G03B 15/006 |
| | | | 361/695 |
| 2017/0231114 A1 * | 8/2017 | Butscher | B64D 43/00 |

* cited by examiner

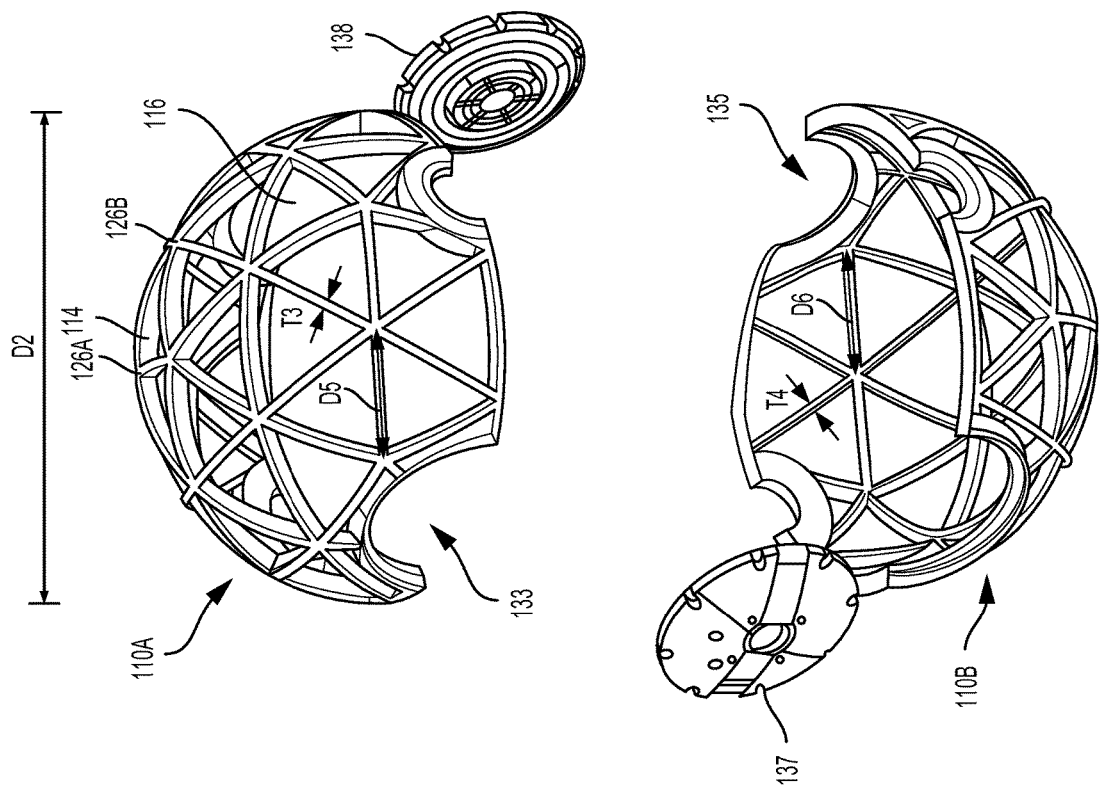
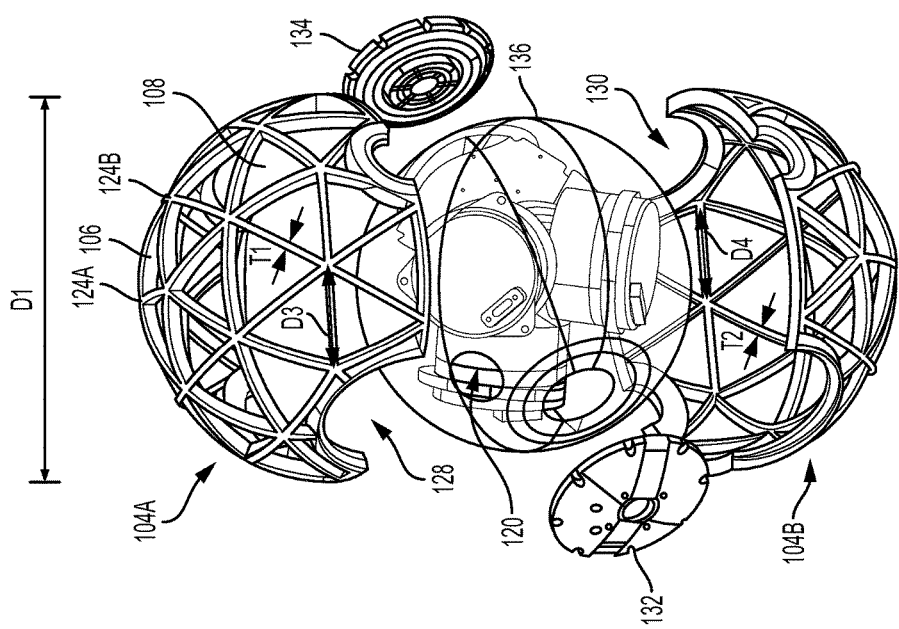
FIG. 3A
FIG. 3B

OPEN ARCHITECTURE GIMBALED NAVIGATION SYSTEM USING LATTICE SHELLS

FIELD

The present disclosure relates generally to gimbaled systems, and more particularly, to gimbaled inertial measurement units with lattice structures to improve airflow.

BACKGROUND

An inertial measurement unit ("IMU") is an electronic device that measures and reports a velocity, orientation, and gravitational forces of a craft using a combination of accelerometers, gyroscopes, and magnetometers. One type of IMU includes a spherical gimbal system. The spherical gimbal system includes two or more gimbal shells of decreasing size placed within each other, and an instrument mount including electronics located in the center of the spherical gimbal system. In operation, the electronics of the instrument mount of the gimbal system produce heat that can alter the operation of the gimbal system. In particular, accelerometers and gyroscopes used in instrument mounts for IMUs are highly sensitive to changes in temperature and thermal gradients. Consistent airflow can help mitigates the primary cause of temperature fluctuations (and thus navigation errors) within these systems.

Existing convection cooled solutions have used fans and shrouds attached to the gimbals and instrument mount or high flow external fans in an attempt to provide consistent cooling. Fans (typically small and very high speed 15,000-20,000 RPM) attached to the instrument mount can be blocked or shadowed by the gimbal shells and other components depending on the orientation of the system, thereby reducing the effectiveness of the cooling. Further, such fans can induce vibrations to the sensitive inertial instruments and are a source of structure-borne noise that reduces the accuracy of the electronics in the instrument mount. Gas conduction cooled systems eliminate the instrument mount fan at the expense of high gimbal mass and inertia. While effective thermally when consistent rotation rates are employed, such gas conduction cooled systems require larger bearings to support the loads and very precise machining to keep the gimbal gap variation to a few thousandths of an inch, leading to an increase in cost to manufacture.

Accordingly, there is a need for a system that effectively cools an IMU without affecting the operation of the IMU.

SUMMARY

In one aspect, an inertial measurement unit is described. The inertial measurement unit includes a first spherical gimbal comprising a first lattice structure including a first plurality of trusses defining a first plurality of interstitial voids between the first plurality of trusses. The inertial measurement unit further includes a second spherical gimbal comprising a second lattice structure including a second plurality of trusses defining a second plurality of interstitial voids between the second plurality of trusses. The first spherical gimbal is positioned inside of the second spherical gimbal and pivotally coupled to the second spherical gimbal to form a gap between the first spherical gimbal and the second spherical gimbal. The inertial measurement unit further includes an instrument mount positioned within and pivotally coupled to the first spherical gimbal.

In another aspect, a method of additively manufacturing an inertial measurement unit is described. The method includes forming a first spherical gimbal comprising a first lattice structure including a first plurality of trusses defining a first plurality of interstitial voids between the first plurality of trusses. The method also includes forming a second spherical gimbal comprising a second lattice structure including a second plurality of trusses defining a second plurality of interstitial voids between the second plurality of trusses, where the first spherical gimbal is positioned inside of the second spherical gimbal and pivotally coupled to the second spherical gimbal to form a gap between the first spherical gimbal and the second spherical gimbal. The method also providing an instrument mount positioned within and pivotally coupled to the first spherical gimbal.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures.

FIG. 3A is an exploded view of the lattice structure shown in FIG. 2A, according to an example embodiment.

FIG. 3B is an exploded view of the lattice structure shown in FIG. 2B, according to an example embodiment.

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 1:
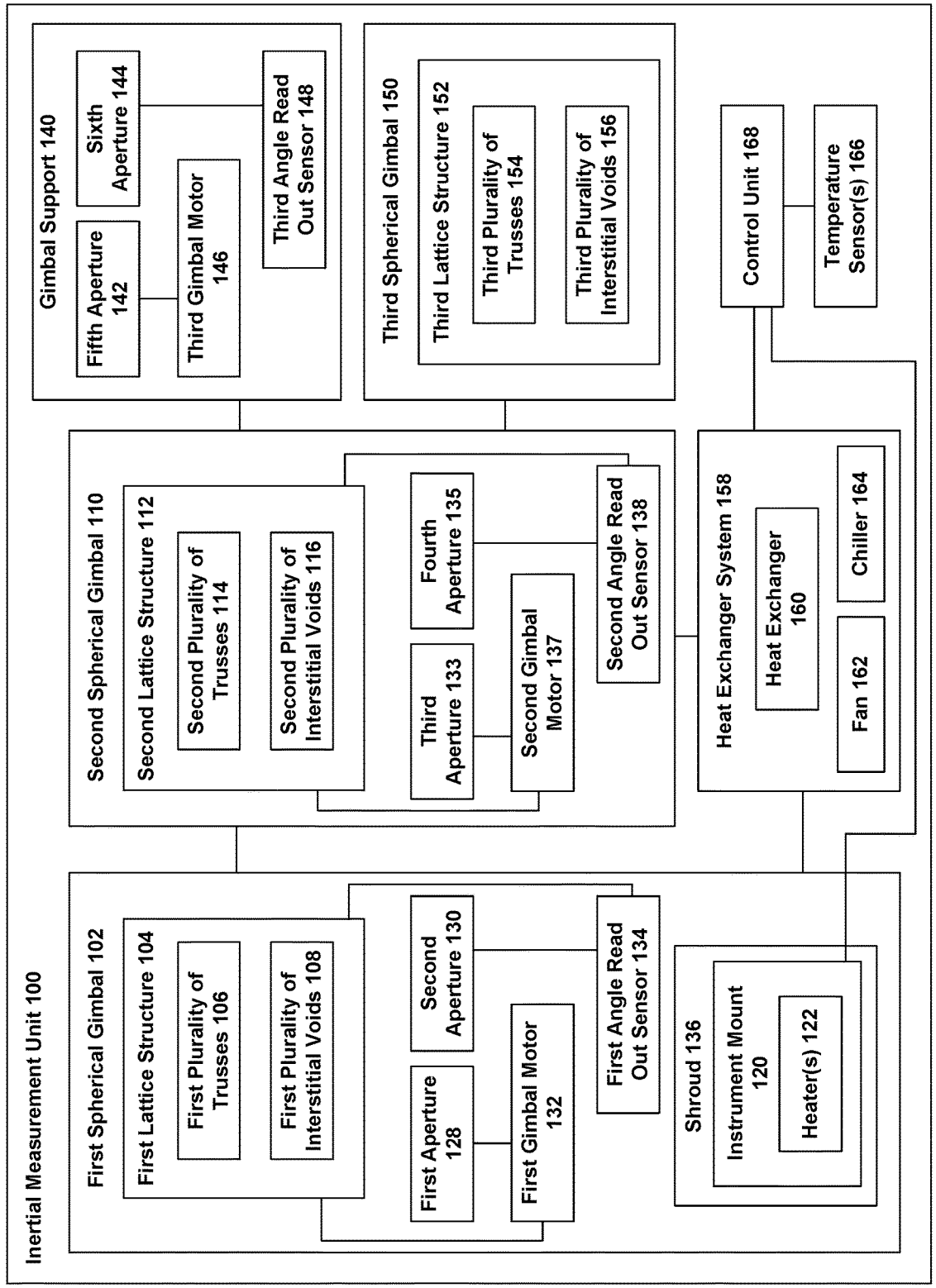
FIG. 1 is a block diagram of an example heat exchanger, according to an example embodiment.

In FIG. 1, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 8:
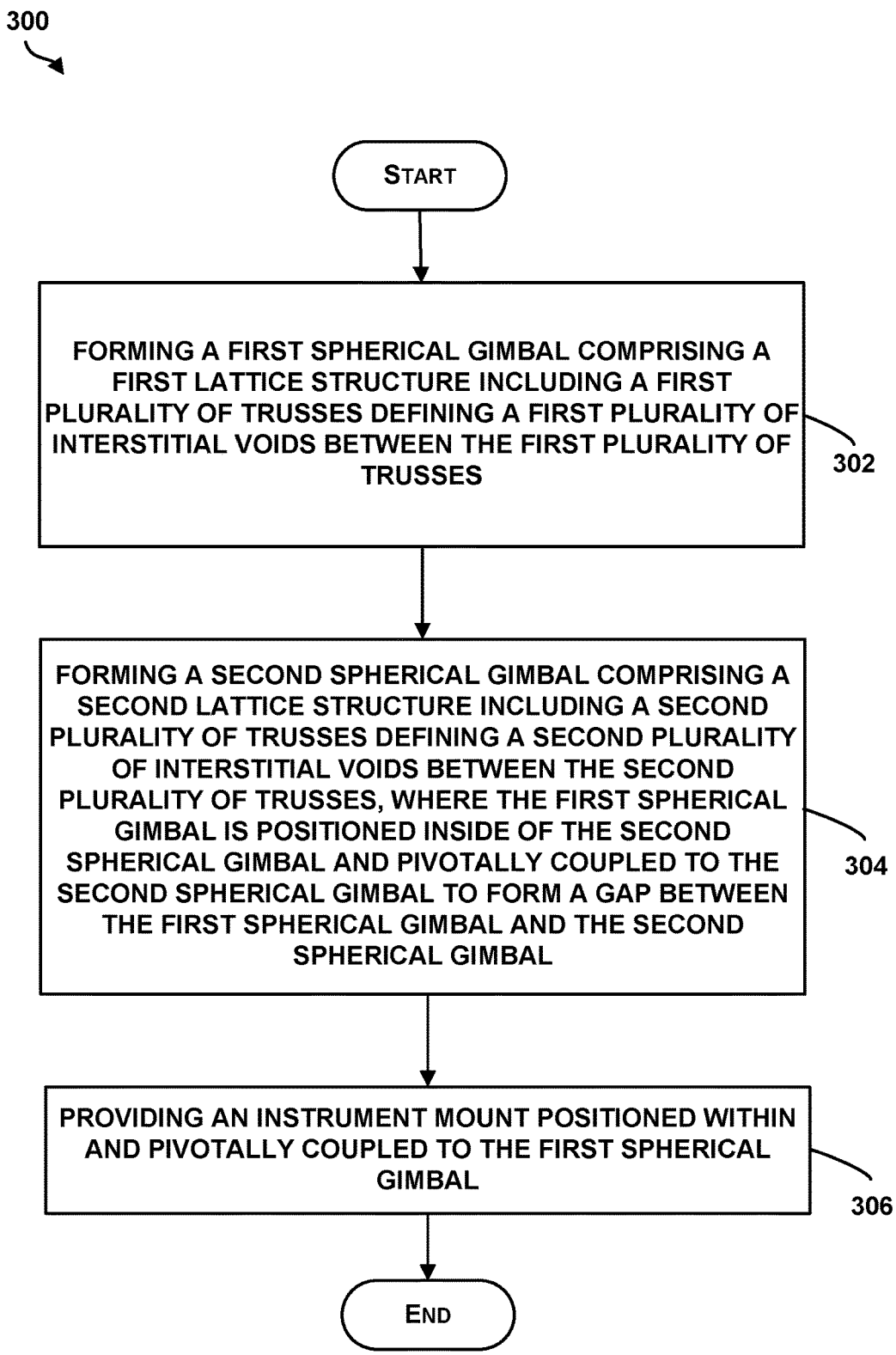
FIG. 8 is a flowchart of an example method, according to an example embodiment.

In FIG. 8, the blocks may represent operations and/or portions thereof and lines connecting the various blocks do not imply any particular order or dependency of the operations or portions thereof. It will be understood that not all dependencies among the various disclosed operations are necessarily represented. FIG. 8 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means +/−5%.

As used herein, "lattice structure" means a regularly repeating three-dimensional geometrical arrangement of a plurality of trusses, where the plurality of trusses intersect each other with spaces between to thereby define a plurality of interstitial voids between the plurality of trusses.

Illustrative, non-exhaustive examples, which may or may not be claimed, of the subject matter according the present disclosure are provided below.

Within examples, an open architecture gimbaled navigator using lattice structure spherical gimbals is described herein. Such an open architecture gimbaled navigator using lattice structure spherical gimbals is a paradigm shift in the construct of gimbaled navigation systems. Strategic and tactical grade inertial guidance systems for aircraft, spacecraft, and submarines require gimbaled mechanisms to position and calibrate their inertial instruments. These precision instruments are very sensitive to thermal changes and have historically been subjected to inconsistent cooling due to gimbal components impeding airflow. The lattice structure spherical gimbals provide a unique combination of an open architecture to facilitate uninhibited airflow, low mass for increased g-load capacity, high stiffness to reduce reliance on exotic materials (e.g., beryllium), and thin section geometry that is ideal for additive manufacturing.

Further, the open architecture gimbaled navigator with lattice structure spherical gimbals allows the use of a larger low speed fan mounted external to the system to route air/gas directly to an instrument mount. The cooling air is capable of being routed directly to the instrument mount without the obstruction of gimbals. In addition, acoustics and structure-borne noise are mitigated by using a larger, low speed fan verses a small high speed fan.

Various other features of the example devices and systems discussed above, as well as methods for using these devices, are also described hereinafter with reference to the accompanying figures.

Referring generally to FIG. 1 and particularly to, e.g., FIGS. 2-6, an exemplary inertial measurement unit (IMU) 100 is disclosed. While FIG. 1 illustrates various components contained in the IMU 100, FIG. 1 illustrates one example of an inertial measurement unit and additional components can be added and existing components can be removed.

As illustrated in FIG. 1, the IMU 100 includes a first spherical gimbal 102 including a first lattice structure 104. The first lattice structure 104 includes a first plurality of trusses 106 defining a first plurality of interstitial voids 108 between the first plurality of trusses 106. The IMU 100 further includes a second spherical gimbal 110 that includes a second lattice structure 112. The second lattice structure 112 includes a second plurality of trusses 114 defining a second plurality of interstitial voids 116 between the second plurality of trusses 114. The first spherical gimbal 102 is positioned inside of the second spherical gimbal 110. As such, and a shown in FIGS. 2A and 2B, the first spherical gimbal 102 has a first diameter $D_1$, the second spherical gimbal 110 has a second diameter $D_2$, and the second diameter $D_2$ is greater than the first diameter $D_1$. The first spherical gimbal 102 is pivotally coupled to the second spherical gimbal 110 to form a gap between the first spherical gimbal 102 and the second spherical gimbal 110. As such, the first spherical gimbal 102 and the second spherical gimbal 110 are rotatable with respect to one another.

Referring again to FIG. 1, the IMU 100 further includes an instrument mount 120 positioned within and pivotally coupled to the first spherical gimbal 102. The instrument mount 120 can include any mechanical, electrical, and electro-mechanical systems and devices to aid in the operation of the IMU 100. For example, the instrument mount 120 can include one or more of an accelerometer, a magnetometer, a stellar sensor, an angular rate sensor, and a global positioning sensor.

In one example, the IMU 100 further includes one or more heaters 122 disposed within the instrument mount 120 to maintain the instrument mount 120 at a substantially constant temperature. For example, the one or more heaters 122 may be operative when the instrument mount 120 is not outputting a threshold amount of heat. Maintaining a constant temperature output of the instrument mount 120 and, more generally, the IMU 100 facilitates the temperature control of the IMU 100. For example, the heat output by an electronics assembly (e.g., the components of the instrument mount 120) can vary based on the current use of the electronics assembly (e.g., an electronics assembly not being used outputs less heat than an electronics assembly that is in use).

Figure 2B:
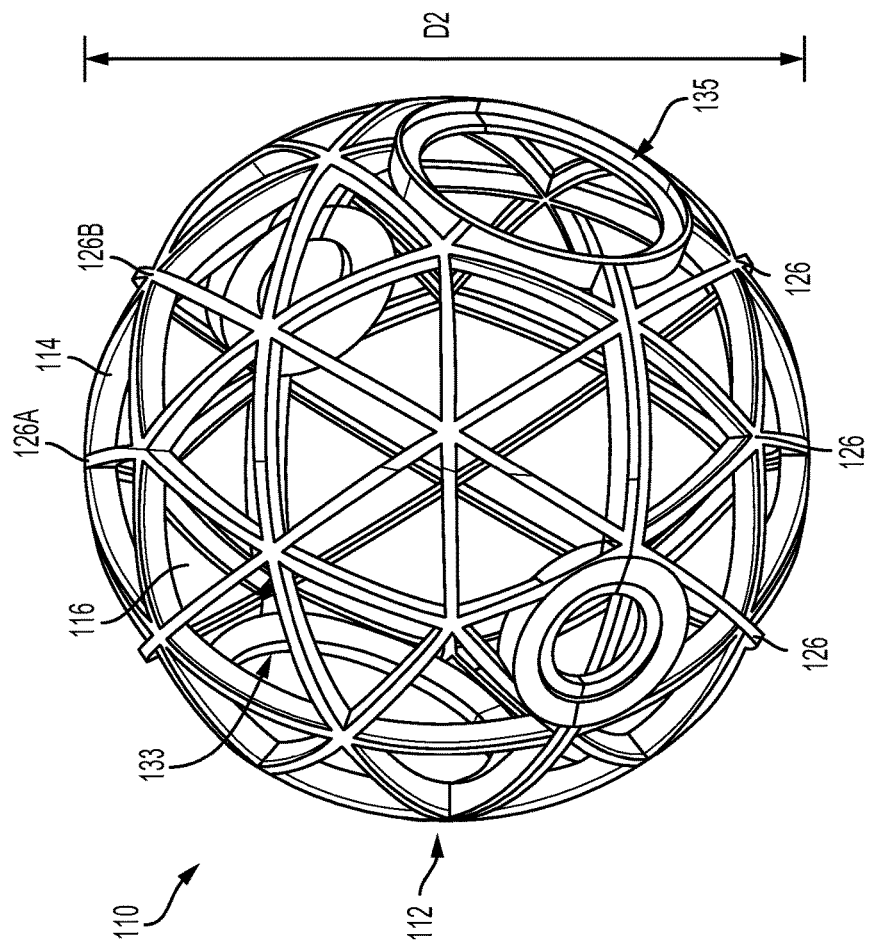
FIG. 2B is a perspective view of another example lattice structure, according to an example embodiment.
Figure 2A:
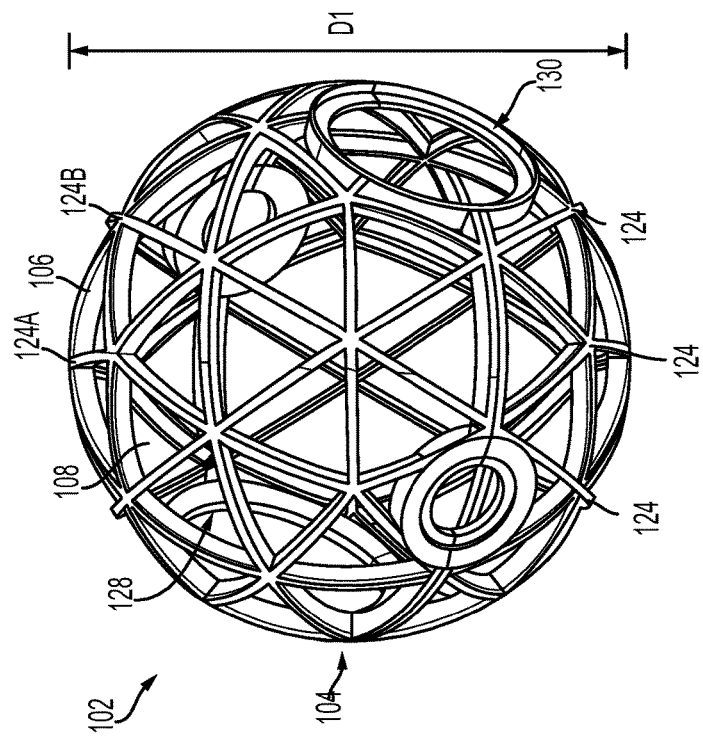
FIG. 2A is a perspective view of an example lattice structure, according to an example embodiment.

In one embodiment, as shown in FIG. 2A, the first lattice structure 104 may comprise a complete sphere with the first plurality of trusses 106 intersecting at a first plurality of nodes 124 and defining the first plurality of interstitial voids 108 between the first plurality of trusses 106. Similarly, as shown in FIG. 2B, the second lattice structure 112 may comprise a complete sphere with the second plurality of trusses 114 intersecting at a second plurality of nodes 126 and defining the second plurality of interstitial voids 116 between the second plurality of trusses 114. A distance between adjacent nodes 124A, 124B of the first plurality of nodes 124 in the first lattice structure 104 may be increased or decreased to thereby change the stiffness of the first lattice structure 104. Similarly, a distance between adjacent nodes 126A, 126B of the second plurality of nodes 126 in the second lattice structure 112 may be increased or decreased to thereby change the stiffness of the second lattice structure 112. For example, if the distance between adjacent nodes 124A, 124B in the first plurality of nodes 124 in the first lattice structure 104 is increased, the stiffness of first lattice structure 104 will decrease. Similarly, if the distance between adjacent nodes 126A, 126B in the second plurality of nodes 126 in the second lattice structure 112 is increased, the stiffness of second lattice structure 112 will decrease.

Further, if the distance between adjacent nodes 124A, 124B of the first plurality of nodes 124 in the first lattice structure 104 is decreased, the stiffness of first lattice structure 104 will increase. Similarly, if the distance between adjacent nodes 126A, 126B of the second plurality of nodes 126 in the second lattice structure 112 is decreased, the stiffness of second lattice structure 112 will increase.

In another embodiment, a distance $D_3$ between adjacent nodes 124A, 124B of the first plurality of nodes 124 in a first portion of the first lattice structure 104 is greater than a distance $D_4$ between adjacent nodes 124A, 124B of the first plurality of nodes 124 in a second portion of the first lattice structure 104. As such, the first portion of the first lattice structure 104 may have a different stiffness than the second portion of the first lattice structure 104. Similarly, in another embodiment, a distance $D_5$ between adjacent nodes 126A, 126B of the second plurality of nodes 126 in a first portion of the second lattice structure 112 is greater than a distance $D_6$ between adjacent nodes 126A, 126B of the second plurality of nodes 126 in a second portion of the second lattice structure 112. As such, the first portion of the second lattice structure 112 may have a different stiffness than the second portion of the second lattice structure 112. Further, such an arrangement may enable tailoring of the first and second lattice structures 104, 112 to create the absence of the lattice structure in certain areas to avoid shadowing during cooling of the instrument mount 120.

In one example, a thickness of the first plurality of trusses 106 is consistent for the entire first lattice structure 104 of the first spherical gimbal 102. Similarly, in one example a thickness of the second plurality of trusses 114 is consistent for the entire second lattice structure 112 of the second spherical gimbal 110. In another example, a first portion of the first plurality of trusses 106 has a first thickness $T_1$, and a second portion of the first plurality of trusses 106 have a second thickness $T_2$ that is different than the first thickness. Similarly, in another example a first portion of the second plurality of trusses 114 have a first thickness $T_3$, and a second portion of the second plurality of trusses 114 have a second thickness $T_4$ that is different than the first thickness. Such an arrangement provides variable stiffness throughout the first and second lattice structures 104, 112.

As shown in FIG. 3A, the first spherical gimbal 102 may include a first aperture 128 and a second aperture 130 opposing the first aperture 128. As shown in FIG. 3A, the IMU 100 may further include a first gimbal motor 132 positioned at least partially in the first aperture 128 to control rotation of the first spherical gimbal 102 with respect to a first axis. The IMU 100 may further include a first angle read out sensor 134 positioned at least partially in the second aperture 130 to provide a signal representative of an incremental, angular movement, or position of the first spherical gimbal 102 relative to a zero point.

As shown in FIG. 3B, the second spherical gimbal 110 may include a third aperture 133 and a fourth aperture 135 opposing the third aperture 133. In such an example, and as shown in FIG. 2B, the IMU 100 may further include a second gimbal motor 137 positioned at least partially in the third aperture 133 to control rotation of the second spherical gimbal 110 with respect to a second axis. The IMU 100 may also include a second angle read out sensor 138 positioned at least partially in the fourth aperture 135 to provide a signal representative of an incremental, angular movement, or position of the second spherical gimbal 110 relative to a zero point.

Figure 4:
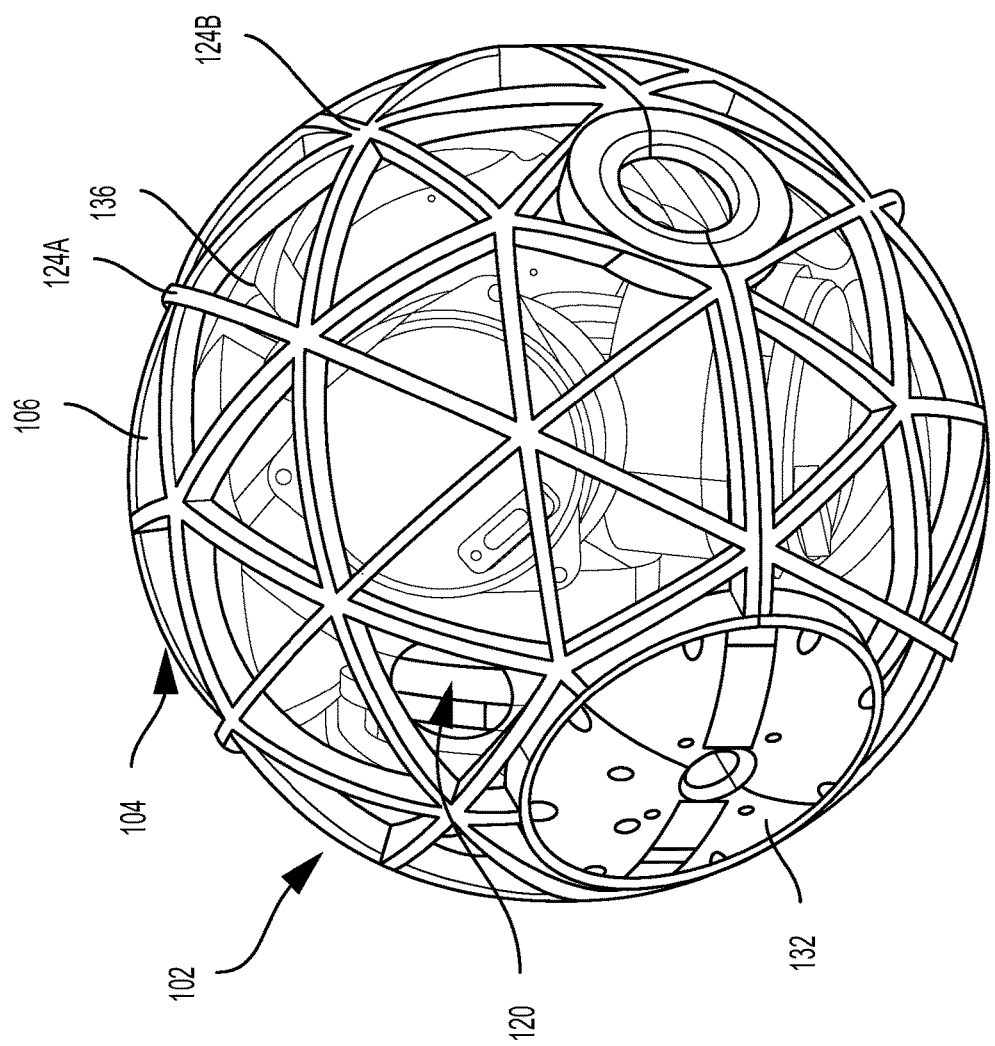
FIG. 4 is a perspective view of the instrument mount and the example lattice structure of FIG. 3, according to an example embodiment.

As shown in FIG. 3A, the IMU 100 may further include a shroud 136 at least partially surrounding the instrument mount 120 and positioned inside of the first spherical gimbal 102. Such a shroud 136 may provide improved accuracy of temperature control of the components of the instrument mount 120. In another example, the shroud 136 is removed from the IMU 100. FIG. 4 illustrates the assembled instrument mount 120 and shroud 136 positioned within the first spherical gimbal 102, the first gimbal motor 132 positioned at least partially in the first aperture 128, and the first angle read out sensor 134 positioned at least partially in the second aperture 130, shown in the exploded view in FIG. 3.

Figure 5:
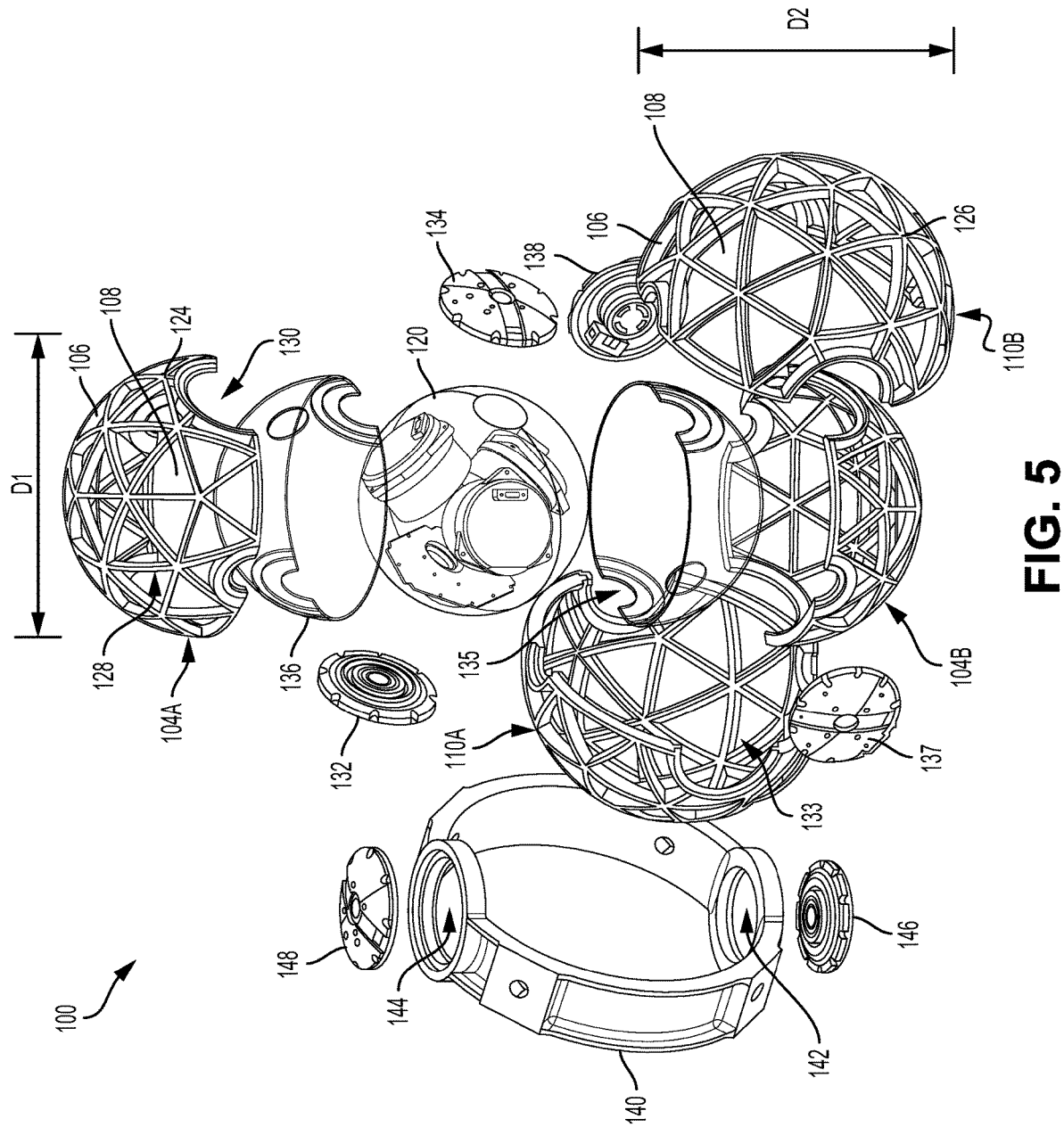
FIG. 5 is an exploded view of an example inertial measurement unit, according to an example embodiment.

In one embodiment, as shown in FIG. 5, the first spherical gimbal 102 may include two or more components 104A, 104B removably coupled to one another to form the first spherical gimbal 102. Similarly, as shown in FIG. 5, the second spherical gimbal 110 comprises two or more components 113A, 113B removably coupled to one another to form the second spherical gimbal 110. Such an arrangement enables an operator to open the first and second spherical gimbals 102, 110 to access the instrument mount 120 for maintenance and troubleshooting as necessary. The two or more components 104A, 104B of the first spherical gimbal 102 and the two or more components 113A, 113B of the second spherical gimbal 110 may comprise two components as shown in FIG. 5, or may comprise three or four components. Further, the two or more components 104A, 104B of the first spherical gimbal 102 and the two or more components 113A, 113B of the second spherical gimbal 110 may be removably coupled to one another via fasteners, snaps, clips, screws, or any other temporary coupling mechanism.

As shown in FIG. 5, the IMU 100 may further include a gimbal support 140 pivotally coupled to the second spherical gimbal 110 and at least partially surrounding the second spherical gimbal 110. The gimbal support 140 provides an interface between the rotational spherical gimbals 102, 110 and the structure to which the IMU 100 is mounted. In one example, as shown in FIG. 5, the gimbal support 140 comprises a solid ring partially surrounding the second spherical gimbal 110. In another embodiment, the gimbal support 140 may comprise a lattice structure. Other arrangements are possible as well.

Figure 6:
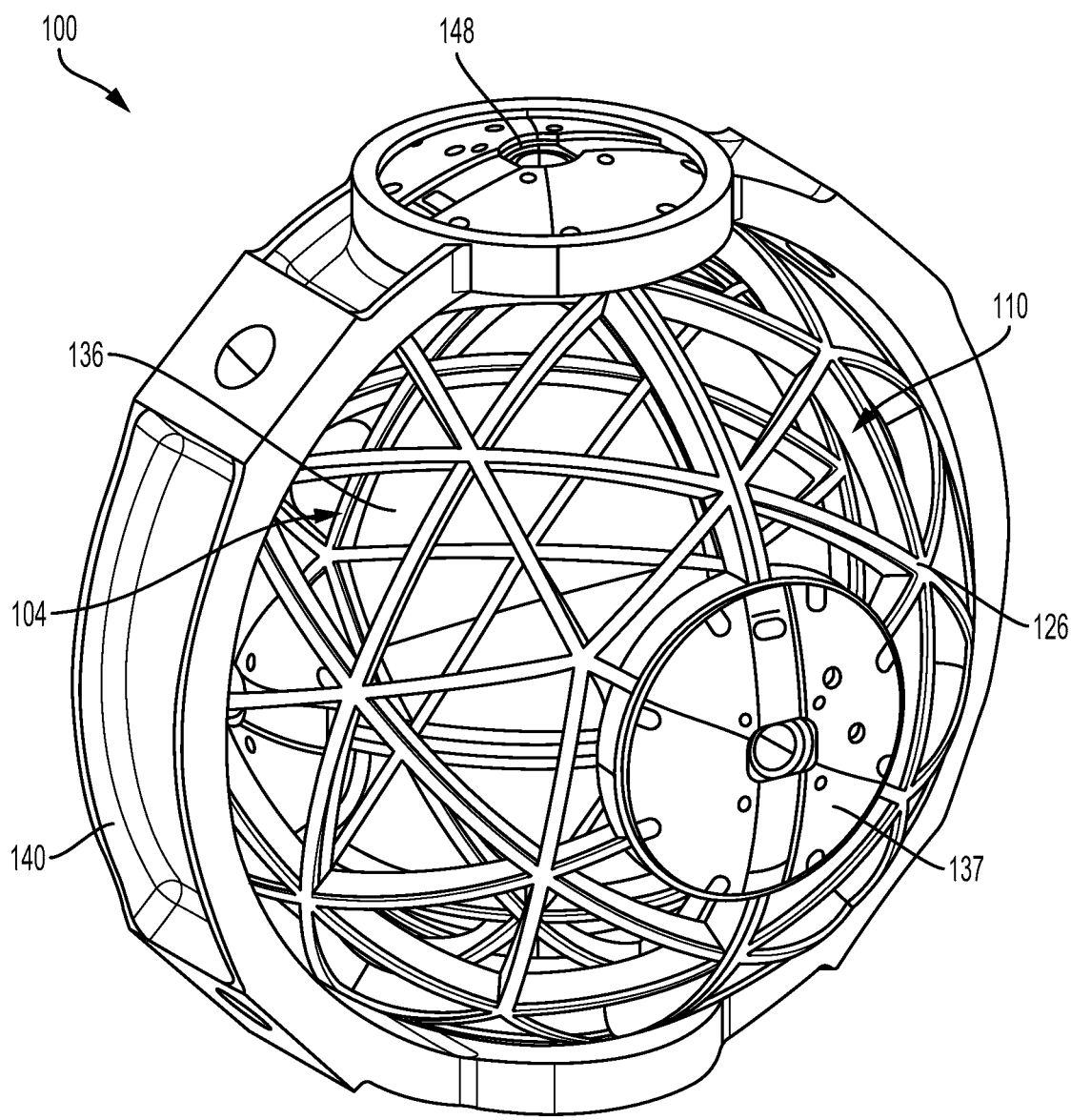
FIG. 6 is a perspective view of the inertial measurement unit of FIG. 5, according to an example embodiment.

As shown in FIG. 5, the gimbal support 140 may include a fifth aperture 142 and a sixth aperture 144 opposing the fifth aperture 142. In such an embodiment, the IMU 100 may further include a third gimbal motor 146 positioned at least partially in the fifth aperture 142 to control rotation of the gimbal support 140 with respect to a third axis. The IMU 100 may further include a third angle read out sensor 148 positioned at least partially in the sixth aperture 144 to provide a signal representative of an incremental, angular movement, or position of the gimbal support 140 relative to a zero point. FIG. 6 illustrates the assembled IMU 100 shown in the exploded view in FIG. 5.

Referring again to FIG. 1, in another embodiment, the IMU 100 may further include a third spherical gimbal 150 comprising a third lattice structure 152 including a third plurality of trusses 154 defining a third plurality of interstitial voids 156 between the third plurality of trusses 154. In such an example, the second spherical gimbal 110 is positioned inside of the third spherical gimbal 150 and pivotally coupled to the third spherical gimbal 150 to form a gap between the second spherical gimbal 110 and the third spherical gimbal 150. Such an arrangement provides an additional degree of freedom to the IMU 100.

In yet another embodiment, the IMU 100 may further include a heat exchanger system 158 positioned adjacent to the second spherical gimbal 110. In such an example, the heat exchanger system 158 provides a cooling flow through the second spherical gimbal 110 and the first spherical gimbal 102 to cool the instrument mount 120 positioned in the first spherical gimbal 102. In one example, the heat exchanger system 158 includes a heat exchanger 160 and a fan 162. The heat exchanger 160 can be configured to cool the airflow generated by the fan 162. In some aspects, the heat exchanger 160 can include a radiator system that circulates a fluid thought a radiator. The radiator system transfers heat from the air within the IMU 100 to the fluid in the radiator system. In some aspects, the heat exchanger 160 can include a heat sink system that conducts heat out of the IMU 100. The fan 162 may be positioned external to the second spherical gimbal 110 for establishing airflow across a chiller 164 and through the second spherical gimbal 110 and the first spherical gimbal 102 to cool the instrument mount 120 positioned in the first spherical gimbal 102. The fan 162 may comprise a low speed fan having an RPM less than about 3,000 RPM.

Further, the IMU 100 may further include one or more temperature sensors 166 coupled to the instrument mount 120, and a control unit 168 coupled to the one or more temperature sensors 166 and the heat exchanger system 158. In such an example, the control unit 168 is configured to control operation of the heat exchanger system 158 in response to temperatures sensed by the one or more temperature sensors 166. The control unit 168 can be positioned at any location in the IMU 100, and may also be coupled to the instrument mount 120 to thereby control and alter the operation of the instruments in the instrument mount 120. In some aspects, the control until 168 can control and alter the operation of the fan 162. For example, the control unit 168 can increase or decrease the speed of the fan 162. In some aspects, the control unit 168 can control and alter the operation of the heat exchanger 160 as well.

In certain embodiments, such as shown in any one of FIGS. 1-6, example devices or components thereof are made using an additive-manufacturing machine, such as stereolithography, multi-jet modeling, inkjet printing, selective laser sintering/melting, and fused filament fabrication, among other possibilities. Additive manufacturing enables one or more components of the IMU 100 and other physical objects to be created as intraconnected single-piece structure through the use of a layer-upon-layer generation process. Additive manufacturing involves depositing a physical object in one or more selected materials based on a design of the object. For example, additive manufacturing can generate one or more components of the IMU 100 using a Computer Aided Design (CAD) of the IMU 100 as instructions. As a result, changes to the design of the IMU 100 can be immediately carried out in subsequent physical creations of the IMU 100. This enables the components of the IMU 100 to be easily adjusted or scaled to fit different types of applications (e.g., for use in various tank sizes).

The layer-upon-layer process utilized in additive manufacturing can deposit one or more components of the IMU 100 with complex designs that might not be possible for IMUs assembled with traditional manufacturing. In turn, the design of the IMU 100 can include aspects that aim to improve overall operation. For example, the design can incorporate physical elements that help redirect stresses in a desired manner that traditionally manufactured IMUs might not be able to replicate.

Additive manufacturing also enables depositing one or more components of the IMU 100 in a variety of materials. For instance, in some examples, one or more components of the IMU 100 is deposited using nickel-chromium-based super alloys (e.g., Inconel 625 for ductility in cryogenic environments and durability in high-temperature environments), magnesium, titanium, stainless steel, titanium, nickel super-alloy, aluminum, polymer composites (e.g., carbon fiber reinforced nylon) and polymer nanocomposites (e.g., carbon nanotube filled nylon), polyether ether ketone (PEEK), polyethylene (PE), or polypropylene (PP). In other examples, other materials are used.

In another example implementation, one or more components of the IMU 100 are generated using a combination of different materials. In such an example, the first spherical gimbal 102 may be made from a first material, and the second spherical gimbal 110 may be made from a second material that is different than the first material. In another example, the first and second spherical gimbals 102, 110 may be made from a first material, and the gimbal support 140 may be made from a second material that is different than the first material. Other examples are possible as well. Further, one or more components of the IMU 100 can have some layers that are created using a first type of material and other layers that are created using a second type of material. In addition, various processes are used in other examples to produce one or more components of the IMU 100. These processes are included in table 1.

TABLE 1

| | |
|---|---|
| DEP | Direct Energy Deposition |
| DMLS | Direct Metal Laser Sintering |
| DMP | Direct Metal Printing |
| EBAM | Electron Beam Additive Manufacturing |
| EBM | Electron Beam Leting |
| EBPD | Electron Beam Powder Bed |
| FDM | Fused Deposition Modeling |
| IPD | Indirect Power Bed |
| LCT | Laser Cladding Technology |
| LDT | Laser Deposition Technology |
| LDW | Laser Deposition Welding |
| LDWM | Laser Deposition Welding with integrated Milling |
| LENS | Laser Engineering Net Shape |
| LFMT | Laser Freeform Manufacturing Technology |
| LMD-p | Laser Metal Deposition-powder |
| LMD-w | Laser Metal Deposition-wire |
| LPB | Laser Powder Bed |
| LPD | Laser Puddle Deposition |
| LRT | Laser Repair Technology |
| PDED | Powder Directed Energy Deposition |
| SLA | Stereolithography |
| SLM | Selective Laser Melting |
| SLS | Selective Laser Sintering |
| SPD | Small Puddle Deposition |

In some example implementations, one or more components of the IMU 100 are generated using melt-away support materials, such as sulfone, thermoplastic, polyester, organic composite photoresist materials and dry film resists. Particularly, during the layer-upon-layer generation process, a melt-away support material can support one or more components of the IMU 100 until the one or more components of the IMU 100 are complete and stable enough to stand-alone. In turn, the melt-away support material can support physical aspects of the IMU 100 during the layer-upon-layer generation process until the IMU 100 is completed. After the one or more components of the IMU 100 are completed, the melt-away support material can be removed to leave only the finished components remaining. For instance, a water soluble melt-away support material can rinse away from portions of the IMU 100.

In an example implementation, one or more components of the IMU 100 are constructed using one or more elastic materials. Elastic materials can enable the IMU 100 to be compressed and expanded during operation. Quasi-elastic materials can similarly be used to create one or more components of the IMU 100.

Figure 7:
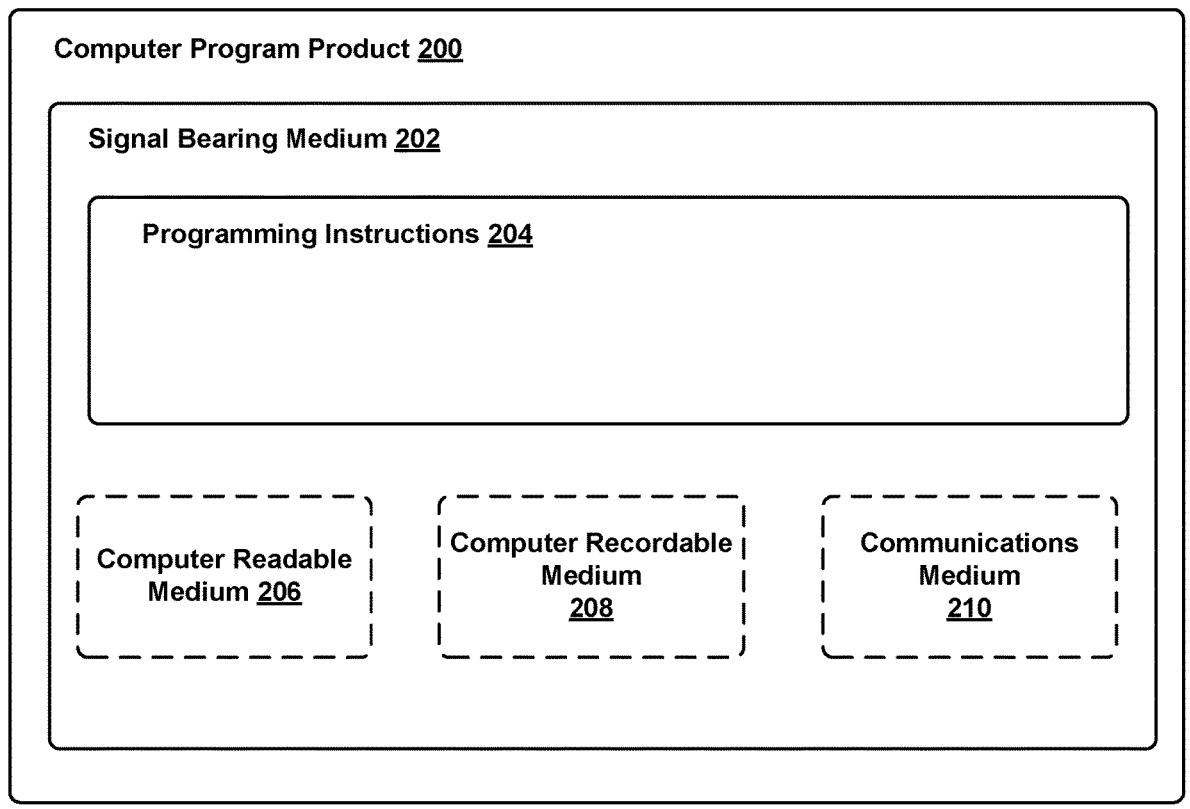
FIG. 7 is an example computer-readable medium, according to an example implementation.

FIG. 7 depicts an example computer-readable medium configured according to an example implementation. In example implementations, an example system may include one or more processors, one or more forms of memory, one or more input devices/interfaces, one or more output devices/interfaces, and machine readable instructions that when executed by the one or more processors cause an additive manufacturing machine to create one or more components of the inertial measurement unit 100 of any of the embodiment described above with respect to FIGS. 1-6.

In one implementation, the example computer program product 200 is provided using a signal bearing medium 202. The signal bearing medium 202 may include one or more programming instructions 204 that, when executed by one or more processors may cause an additive manufacturing machine to create one or more components of the inertial measurement unit 100 of any of the embodiment described above with respect to FIGS. 1-6. In some examples, the signal bearing medium 202 may be a computer-readable medium 206, such as, but not limited to, a hard disk drive, a Compact Disc (CD), a Digital Video Disk (DVD), a digital tape, memory, etc. In some implementations, the signal bearing medium 202 may be a computer recordable medium 208, such as, but not limited to, memory, read/write (R/W) CDs, R/W DVDs, etc. In some implementations, the signal bearing medium 202 may be a communication medium 210 (e.g., a fiber optic cable, a waveguide, a wired communications link, etc.). Thus, for example, the signal bearing medium 202 may be conveyed by a wireless form of the communications medium 210.

The one or more programming instructions 204 may be, for example, computer executable and/or logic implemented instructions. In some examples, a computing device may be configured to provide various operations, functions, or actions in response to the programming instructions 204 conveyed to the computing device by one or more of the computer-readable medium 206, the computer recordable medium 208, and/or the communications medium 210.

The computer-readable medium 206 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

FIG. 8 is a block diagram of an example method of additively manufacturing an inertial measurement unit. Method 300 shown in FIG. 8 presents an embodiment of a method that could be used by the inertial measurement unit 100 of FIGS. 1-6, as an example. Method 300 includes one or more operations, functions, or actions as illustrated by one or more of blocks 302-306. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, the method 300 can be caused to be performed by program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 8 may represent circuitry that is wired to perform the specific logical functions in the process.

Initially, at block 302, the method 300 includes forming a first spherical gimbal 102 comprising a first lattice structure 104 including a first plurality of trusses 106 defining a first plurality of interstitial voids 108 between the first plurality of trusses 106. At block 304, the method 300 includes forming a second spherical gimbal 110 comprising a second lattice structure 112 including a second plurality of trusses 114 defining a second plurality of interstitial voids 116 between the second plurality of trusses 114, where the first spherical gimbal 102 is positioned inside of the second spherical gimbal 110 and pivotally coupled to the second spherical gimbal 110 to form a gap between the first spherical gimbal 102 and the second spherical gimbal 110. Finally, at block 306, the method 300 includes providing an instrument mount 120 positioned within and pivotally coupled to the first spherical gimbal 102.

In another example, the method 300 further includes forming a third spherical gimbal 150 comprising a third lattice structure 152 including a third plurality of trusses 154 defining a third plurality of interstitial voids 156 between the third plurality of trusses 154, where the second spherical gimbal 110 is positioned inside of the third spherical gimbal 150 and pivotally coupled to the third spherical gimbal 150 to form a gap between the second spherical gimbal 110 and the third spherical gimbal 150.

These example methods may be performed by an additive-manufacturing machine, such as stereolithography, multi-jet modeling, inkjet printing, selective laser sintering/melting, and fused filament fabrication, among other possibilities, as discussed above.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An inertial measurement unit comprising:
    a first spherical gimbal comprising a first lattice structure including a first plurality of trusses defining a first plurality of interstitial voids between the first plurality of trusses;
    a second spherical gimbal comprising a second lattice structure including a second plurality of trusses defining a second plurality of interstitial voids between the second plurality of trusses, wherein the first spherical gimbal is positioned inside of the second spherical gimbal and pivotally coupled to the second spherical gimbal to form a gap between the first spherical gimbal and the second spherical gimbal; and
    an instrument mount positioned within and pivotally coupled to the first spherical gimbal.

2. The inertial measurement unit of claim 1, wherein the instrument mount includes one or more of an accelerometer, a magnetometer, a stellar sensor, an angular rate sensor, and a global positioning sensor.

3. The inertial measurement unit of claim 1, further comprising:
    one or more heaters disposed within the instrument mount to maintain the instrument mount at a substantially constant temperature.

4. The inertial measurement unit of claim 1, wherein the first spherical gimbal comprises two or more components removably coupled to one another to form the first spherical gimbal, and wherein the second spherical gimbal comprises two or more components removably coupled to one another to form the second spherical gimbal.

5. The inertial measurement unit of claim 1, further comprising:
    a shroud at least partially surrounding the instrument mount and positioned inside of the first spherical gimbal.

6. A non-transitory computer-readable medium having stored thereon instructions, that when executed by one or more processors, cause an additive manufacturing machine to create one or more components of the inertial measurement unit of claim 1.

7. The inertial measurement unit of claim 1, wherein the first spherical gimbal includes a first aperture and a second aperture opposing the first aperture, and wherein the second spherical gimbal includes a third aperture and a fourth aperture opposing the third aperture.

8. The inertial measurement unit of claim 7, further comprising:
    a first gimbal motor positioned at least partially in the first aperture to control rotation of the first spherical gimbal with respect to a first axis;
    a first angle read out sensor positioned at least partially in the second aperture to provide a signal representative of an incremental, angular movement, or position of the first spherical gimbal relative to a zero point;
    a second gimbal motor positioned at least partially in the third aperture to control rotation of the second spherical gimbal with respect to a second axis; and
    a second angle read out sensor positioned at least partially in the fourth aperture to provide a signal representative of an incremental, angular movement, or position of the second spherical gimbal relative to a zero point.

9. The inertial measurement unit of claim 1, wherein a distance between adjacent nodes of a first plurality of nodes in a first portion of the first lattice structure is greater than a distance between adjacent nodes of the first plurality of nodes in a second portion of the first lattice structure, and wherein a distance between adjacent nodes of the second plurality of nodes in a first portion of the second lattice structure is greater than a distance between adjacent nodes of the second plurality of nodes in a second portion of the second lattice structure.

10. The inertial measurement unit of claim 1, further comprising:
a third spherical gimbal comprising a third lattice structure including a third plurality of trusses defining a third plurality of interstitial voids between the third plurality of trusses, wherein the second spherical gimbal is positioned inside of the third spherical gimbal and pivotally coupled to the third spherical gimbal to form a gap between the second spherical gimbal and the third spherical gimbal.

11. The inertial measurement unit of claim 1, wherein a first portion of the first plurality of trusses have a first thickness, and wherein a second portion of the first plurality of trusses have a second thickness that is different than the first thickness.

12. The inertial measurement unit of claim 1, wherein a first portion of the second plurality of trusses have a first thickness, and wherein a second portion of the second plurality of trusses have a second thickness that is different than the first thickness.

13. The inertial measurement unit of claim 1, further comprising:
a gimbal support pivotally coupled to the second spherical gimbal and at least partially surrounding the second spherical gimbal.

14. The inertial measurement unit of claim 13, wherein the gimbal support includes a fifth aperture and a sixth aperture opposing the fifth aperture, and wherein the system further comprises:
a third gimbal motor positioned at least partially in the fifth aperture to control rotation of the gimbal support with respect to a third axis; and
a third angle read out sensor positioned at least partially in the sixth aperture to provide a signal representative of an incremental, angular movement, or position of the gimbal support relative to a zero point.

15. The inertial measurement unit of claim 1, further comprising:
a heat exchanger system positioned adjacent to the second spherical gimbal, wherein the heat exchanger system provides a cooling flow through the second spherical gimbal and the first spherical gimbal to cool the instrument mount positioned in the first spherical gimbal.

16. The inertial measurement unit of claim 15, further comprising:
one or more temperature sensors coupled to the instrument mount; and
a control unit coupled to the one or more temperature sensors and the heat exchanger system, wherein the control unit is configured to control operation of the heat exchanger system in response to temperatures sensed by the one or more temperature sensors.

17. The inertial measurement unit of claim 15, wherein the heat exchanger system includes a heat exchanger and a fan.

18. The inertial measurement unit of claim 17, wherein the fan is positioned external to the second spherical gimbal for establishing airflow across a chiller and through the second spherical gimbal and the first spherical gimbal to cool the instrument mount positioned in the first spherical gimbal.

19. A method of additively manufacturing an inertial measurement unit, comprising:
forming a first spherical gimbal comprising a first lattice structure including a first plurality of trusses defining a first plurality of interstitial voids between the first plurality of trusses;
forming a second spherical gimbal comprising a second lattice structure including a second plurality of trusses defining a second plurality of interstitial voids between the second plurality of trusses, wherein the first spherical gimbal is positioned inside of the second spherical gimbal and pivotally coupled to the second spherical gimbal to form a gap between the first spherical gimbal and the second spherical gimbal; and
providing an instrument mount positioned within and pivotally coupled to the first spherical gimbal.

20. The method of claim 19, further comprising:
forming a third spherical gimbal comprising a third lattice structure including a third plurality of trusses defining a third plurality of interstitial voids between the third plurality of trusses, wherein the second spherical gimbal is positioned inside of the third spherical gimbal and pivotally coupled to the third spherical gimbal to form a gap between the second spherical gimbal and the third spherical gimbal.

* * * * *